United States Patent
Lim et al.

(10) Patent No.: US 11,297,344 B2
(45) Date of Patent: Apr. 5, 2022

(54) MOTION COMPENSATION METHOD AND DEVICE USING BI-DIRECTIONAL OPTICAL FLOW

(71) Applicant: SK TELECOM CO., LTD., Seoul (KR)

(72) Inventors: Jeong-yeon Lim, Seoul (KR); Hyo Song Kim, Seoul (KR); Hyeong-duck Kim, Suwon-si (KR); Se-hoon Son, Seoul (KR); Jae-seob Shin, Seoul (KR); Gyeong-taek Lee, Seoul (KR); Sun-young Lee, Seoul (KR)

(73) Assignee: SK TELECOM., LTD., Seoul (KR)

( * ) Notice: Subject to any disclaimer, the term of this patent is extended or adjusted under 35 U.S.C. 154(b) by 0 days.

(21) Appl. No.: 16/642,164

(22) PCT Filed: Aug. 29, 2018

(86) PCT No.: PCT/KR2018/009940
§ 371 (c)(1),
(2) Date: Feb. 26, 2020

(87) PCT Pub. No.: WO2019/045427
PCT Pub. Date: Mar. 7, 2019

(65) Prior Publication Data
US 2021/0084325 A1    Mar. 18, 2021

(30) Foreign Application Priority Data

Aug. 29, 2017 (KR) .................. 10-2017-0109632
Dec. 19, 2017 (KR) .................. 10-2017-0175587

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/105* (2014.11); *H04N 19/14* (2014.11); *H04N 19/176* (2014.11)

(58) Field of Classification Search
CPC ...... H04N 19/52; H04N 19/105; H04N 19/14; H04N 19/176
(Continued)

(56) References Cited

U.S. PATENT DOCUMENTS

2008/0002774 A1 * 1/2008 Hoshino ................ H04N 19/56
375/240.16
2011/0002389 A1 * 1/2011 Xu ........................ H04N 19/573
375/240.16
(Continued)

FOREIGN PATENT DOCUMENTS

KR    10-2011-0112240 A    10/2011
WO    2017-034089 A1    3/2017
(Continued)

OTHER PUBLICATIONS

Elena Alshina et al., 'Bi-directional optical flow' From "Joint Collaborative Team on Video Coding (JCT-VC) of ITU-T SG16 WP3 and ISO/IEC JTC1/SC29/WG11" 3rd Meeting: Guangzhou, CN, Oct. 7-15, 2010, 5 pages, Samsung Electronics Co., Ltd.
(Continued)

*Primary Examiner* — Joseph G Ustaris
*Assistant Examiner* — Matthew David Kim
(74) *Attorney, Agent, or Firm* — Hauptman Ham, LLP

(57) ABSTRACT

Disclosed herein is a method for adaptive bidirectional optical flow estimation for inter-screen prediction compensation during video encoding. The method aims to reduce complexity and/or cost of bidirectional optical flow (BIO) at a pixel level or a subblock level.

8 Claims, 10 Drawing Sheets

(51) Int. Cl.
*H04N 19/14* (2014.01)
*H04N 19/105* (2014.01)

(58) Field of Classification Search
USPC ...................................... 375/240.12
See application file for complete search history.

(56) References Cited

U.S. PATENT DOCUMENTS

2013/0202037 A1* 8/2013 Wang ................... H04N 19/577
                                                    375/240.15
2017/0094305 A1* 3/2017 Li ......................... H04N 19/52
2018/0249172 A1* 8/2018 Chen .................... H04N 19/577

FOREIGN PATENT DOCUMENTS

WO    2017-036399 A1    3/2017
WO    2017-058899 A1    4/2017
WO    2017-082698 A1    5/2017

OTHER PUBLICATIONS

E. Alshina et al., 'Known tools performance investigation for next generation video coding' From "ITU-Telecommunications Standardization Sector Study Group 16 Question 6 Video Coding Experts Group (VCEG)" 52nd Meeting: Warsaw, Poland, Jun. 19-26, 2015, 5 pages, Samsung Electronics Co., Ltd.
International Search Report dated Dec. 5, 2018, corresponding to International Application No. PCT/KR2018/009940.

* cited by examiner (a) (b)

MOTION COMPENSATION METHOD AND DEVICE USING BI-DIRECTIONAL OPTICAL FLOW

CROSS-REFERENCE TO RELATED APPLICATION

The present application is a national stage filing under 35 U.S.C § 371 of PCT application number PCT/KR2018/009940 filed on Aug. 29, 2018 which is based upon and claims the benefit of priorities to Korean Patent Application No. 10-2017-0109632, filed on Aug. 29, 2017 and Korean Patent Application No. 10-2017-0175587, filed on Dec. 19, 2017, in the Korean Intellectual Property Office, which are incorporated herein in their entireties by reference.

TECHNICAL FIELD

The present disclosure relates to image encoding or decoding. More specifically, the present disclosure relates to a bidirectional optical flow for motion compensation.

BACKGROUND

The statements in this section merely provide background information related to the present disclosure and may not constitute prior art.

In video encoding, compression is performed using data redundancy in both spatial and temporal dimensions. Spatial redundancy is greatly reduced by transform coding. Temporal redundancy is reduced through predictive coding. Observing that the time correlation is maximized along the motion trajectory, prediction for motion compensation is used for this purpose. In this context, the main purpose of motion estimation is not to find "real" motion in the scene, but to maximize compression efficiency. In other words, the motion vector must provide accurate prediction of a signal. In addition, since motion information must be transmitted as overhead in a compressed bit stream, it must enable a compressed representation. Efficient motion estimation is important in achieving high compression in video encoding.

Motion is an important source of information in video sequences. Motion occurs not only because of movement of an object but also because of movement of the camera. Apparent motion, also known as optical flow, captures spatio-temporal variations in pixel intensity in an image sequence.

Bidirectional Optical Flow (BIO) is a motion estimation/compensation technique for motion refinement based on the assumption of optical flow and steady motion, which is disclosed in JCTVC-C204 and VCEG-AZ05 BIO. The bidirectional optical flow estimation method currently under discussion has an advantage on allowing fine correction of motion vector information, but requires much higher computation complexity than conventional bidirectional prediction for fine correction of motion vector information.

Non-Patent Document 1: JCTVC-C204 (E. Alshina, et al., Bi-directional optical flow, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010)

Non-Patent Document 2: VCEG-AZ05 (E. Alshina, et al., Known tools performance investigation for next generation video coding, ITU-T SG 16 Question 6, Video Coding Experts Group (VCEG), 52nd Meeting: 19-26 Jun. 2015, Warsaw, Poland)

SUMMARY

It is an object of the present disclosure to reduce degradation of an image quality while reducing computation complexity of a bidirectional optical flow (BIO).

In accordance with one aspect of the present disclosure, provided is a method for motion compensation using a bidirectional optical flow (BIO) in video encoding or decoding, the method including generating a first reference block by a first motion vector referring to a first reference picture and generating a second reference block by a second motion vector referring to a second reference picture; calculating a texture complexity of a current block using the first and second reference blocks; and generating a prediction block of the current block based on the first and second reference blocks by selectively applying or skipping the BIO process based on the texture complexity.

In accordance with another aspect of the present disclosure, provided is a device for performing motion compensation using a bidirectional optical flow (BIO) in video encoding or decoding, the device including a reference block generator configured to generate a first reference block by a first motion vector referring to a first reference picture and generate a second reference block by a second motion vector referring to a second reference picture; a skip determiner configured to calculate a texture complexity of a current block using the first and second reference blocks and determine whether to skip a BIO process by comparing the texture complexity with a threshold; and a prediction block generator configured to generate a prediction block of the current block based on the first and second reference blocks by selectively applying or skipping the BIO process based on the determination of the skip determiner.

DETAILED DESCRIPTION

Figure 1:
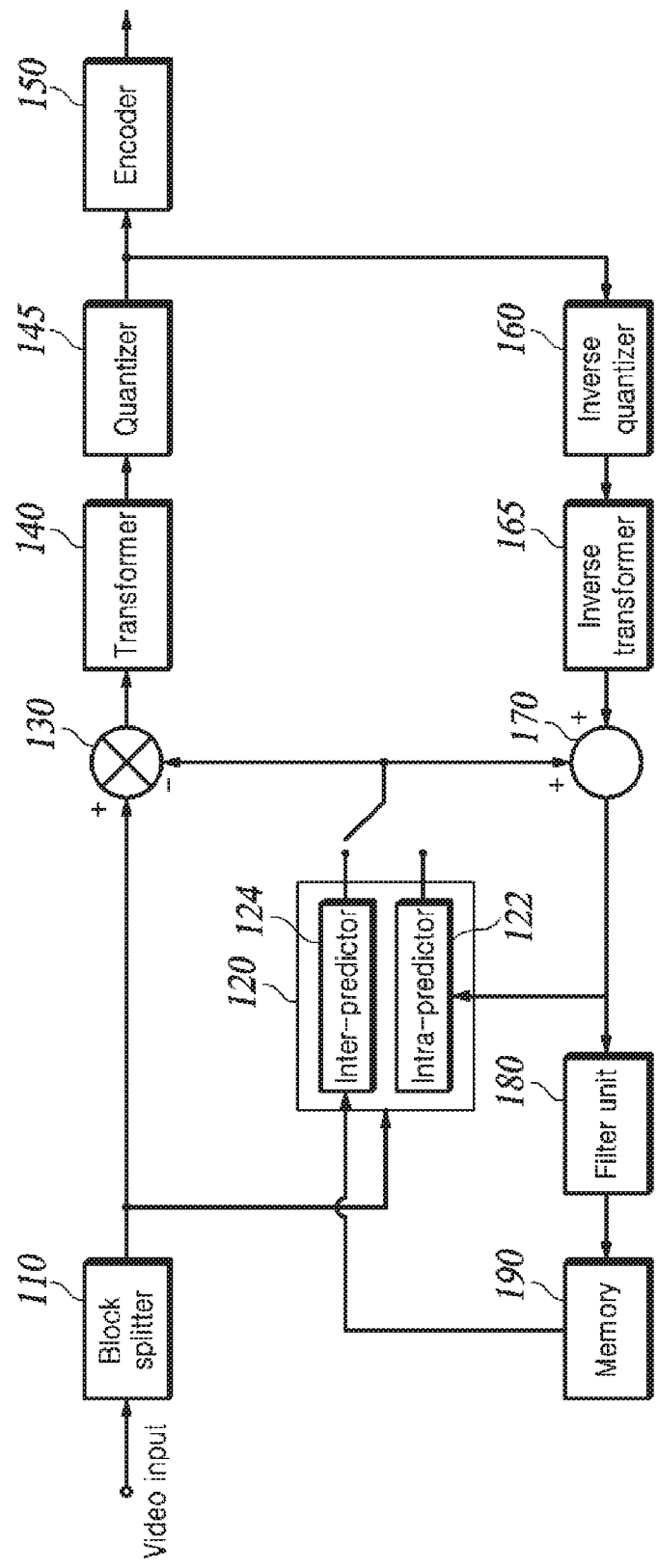
FIG. 1 is an exemplary block diagram of a video encoding apparatus according to an embodiment of the present disclosure.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

The techniques of the present disclosure generally relate to reducing complexity and/or cost of a bidirectional optical flow (BIO) technique. BIO may be applied during motion compensation. In general, the BIO is used to calculate a motion vector for each pixel or subblock in the current block through an optical flow, and to update predicted values of corresponding pixels or subblocks based on the calculated motion vector value for each pixel or subblock.

FIG. 1 is an exemplary block diagram of a video encoding apparatus capable of implementing techniques of the present disclosure.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190. Each element of the video encoding apparatus may be implemented as a hardware chip, or may be implemented as software, and one or more microprocessors may be implemented to execute the functions of the software corresponding to the respective elements.

The block splitter 110 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node (or a parent node) is split into four sub-nodes (or child nodes) of the same size, or a QuadTree plus BinaryTree (QTBT) structure combining the QT structure and a BinaryTree (BT) structure in which a node is split into two sub-nodes, may be used as the tree structure. That is, QTBT may be used to split the CTU into multiple CUs.

In the QuadTree plus BinaryTree (QTBT) structure, a CTU can be first split according to the QT structure. The quadtree splitting may be repeated until the size of the splitting block reaches the minimum block size MinQTSize of the leaf node allowed in QT. If the leaf node of the QT is not greater than the maximum block size MaxBTSize of the root node allowed in the BT, it may be further partitioned into a BT structure. The BT may have a plurality of split types. For example, in some examples, there may be two splitting types, which are a type of horizontally splitting a block of a node into two blocks of the same size (i.e., symmetric horizontal splitting) and a type of vertically splitting a block of a node into two blocks of the same size (i.e., symmetric vertical splitting). Further, there may be a splitting type of splitting a block of a node into two blocks in an asymmetric form. The asymmetric splitting may include splitting a block of a node into two rectangular blocks at a size ratio of 1:3, or splitting a block of a node in a diagonal direction.

The splitting information generated by the block splitter 110 by splitting the CTU by the QTBT structure is encoded by the encoder 150 and transmitted to the video decoding apparatus.

The CU may have various sizes depending on the QTBT splitting of the CTU. Hereinafter, a block corresponding to a CU (i.e., a leaf node of the QTBT) to be encoded or decoded is referred to as a "current block."

The predictor 120 generates a prediction block by predicting a current block. The predictor 120 includes an intra-predictor 122 and an inter-predictor 124.

In general, current blocks within a picture may each be predictively coded. In general, prediction of the current blocks may be accomplished using an intra-prediction technique, which uses data from a picture containing the current blocks, or an inter-prediction technique, which uses data from a picture coded before the picture containing the current blocks. Inter-prediction includes both unidirectional prediction and bidirectional prediction.

For each inter-predicted block, a motion information set may be available. A set of motion information may include motion information about the forward and backward prediction directions. Here, the forward and backward prediction directions are two prediction directions in a bidirectional prediction mode, and the terms "forward direction" and "backward direction" do not necessarily have a geometric meaning. Instead, they generally correspond to whether to display a reference picture before ("backward direction") or after ("forward direction") the current picture. In some examples, the "forward" and "backward" prediction directions may correspond to reference picture list 0 (RefPicList0) and reference picture list 1 (RefPicList1) of the current picture.

For each prediction direction, the motion information includes a reference index and a motion vector. The reference index may be used to identify the reference picture in the current reference picture list (RefPicList0 or RefPicList1). The motion vector has a horizontal component x and a vertical component y. In general, the horizontal component represents horizontal displacement in the reference picture relative to the position of the current blocks in the current picture, which is needed to locate the x coordinate of the reference block. The vertical component represents a vertical displacement in the reference picture relative to the position of the current blocks, which is needed to locate the y coordinate of the reference block.

The inter-predictor 124 generates a prediction block for the current block through a motion compensation procedure. The inter-predictor 124 searches for a block most similar to the current block in a reference picture encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including the information about the reference picture and a motion vector used to predict the current block is encoded by the encoder 150 and transmitted to the video decoding apparatus.

In the case of bidirectional prediction, the inter-predictor 124 selects a first reference picture and a second reference picture from reference picture list 0 and reference picture list 1, respectively, and searches for a block similar to the current block in each of the reference pictures to generate a first reference block and a second reference block. Then, the inter-predictor 124 generates a prediction block for the current block by averaging or weighted-averaging the first reference block and the second reference block. Then, the inter-predictor transmits, to the encoder 150, motion information including information about the two reference pictures and information about two motion vectors used to predict the current block. Here, the two motion vectors represent a first motion vector corresponding to the displacement between the position of the current block in the current picture and the position of the first reference block in the first reference picture (i.e., a motion vector referring to the first reference picture), and a second motion vector corresponding to the displacement between the position of the current block in the current picture and the position of the second reference block in the second reference picture (i.e., a motion vector referring to the second reference picture).

In addition, the inter-predictor 124 may perform a bidirectional optical flow (BIO) process of the present disclosure to generate a prediction block of the current block through bidirectional prediction. In other words, after determining bidirectional motion vectors for the current block, the inter-predictor 124 may generate a prediction block for the current block by motion compensation according the BIO process on a per image pixel basis or a per subblock basis. In other examples, one or more other units of the encoding apparatus may be additionally involved in carrying out the BIO process of the present disclosure. In addition, since the BIO process is performed by applying an explicit equation using pre-decoded information shared between the encoding apparatus and the decoding apparatus, signaling of additional information for the BIO process is not required.

In motion compensation by bidirectional prediction, whether to apply the BIO process may be determined in various ways. Details of the BIO process and details of whether to apply the BIO process in the motion compensation procedure will be described with reference to FIG. 4 and subsequent drawings.

Various methods may be used to minimize the number of bits required to encode motion information.

For example, when the reference picture and the motion vector of the current block are the same as the reference picture and the motion vector of a neighboring block, the motion information about the current block may be transmitted to the decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 2:
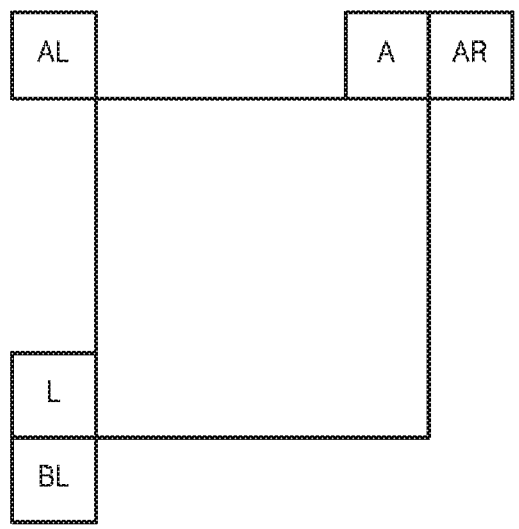
FIG. 2 is an exemplary diagram of neighboring blocks of a current block.

As illustrated in FIG. 2, as neighboring blocks for deriving merge candidates, all or part of a left block L, an above block A, an above right block AR, a bottom left block BL, and an above left block AL which are adjacent to the current block in the current picture may be used. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may also be used as merge candidates.

The inter-predictor 124 configures a merge list including a predetermined number of merge candidates using such neighboring blocks. A merge candidate to be used as the motion information about the current block are selected from among the merge candidates included in the merge list, and merge index information for identifying the selected candidate is generated. The generated merge index information is encoded by the encoder 150 and transmitted to the decoding apparatus.

Another method of encoding the motion information is to encode motion vector differences.

In this method, the inter-predictor 124 derives predictive motion vector candidates for a motion vector of the current block, using neighboring blocks of the current block. As neighboring blocks used to derive the predictive motion vector candidates, all or part of a left block L, an above block A, an above right block AR, a bottom left block BL, and an above left block AL which are adjacent to the current block in the current picture may be used as shown in FIG. 2. In addition, blocks located within a reference picture (which may be the same as or different from the reference picture used to predict the current block) other than the current picture in which the current block is located may be used as the neighboring blocks used to derive the predictive motion vector candidates. For example, a co-located block which is at the same position as the current block or blocks adjacent to the co-located block in the reference picture may be used.

The inter-predictor 124 derives predictive motion vector candidates using the motion vectors of the neighboring blocks, and determines a predictive motion vector for the motion vector of the current block using the predictive motion vector candidates. Then, a motion vector difference is calculated by subtracting the predictive motion vector from the motion vector of the current block.

The predictive motion vector may be obtained by applying a predefined function (e.g., a function for calculating a median, an average, or the like) to the predictive motion vector candidates. In this case, the video decoding apparatus also knows the predefined function. Since the neighboring blocks used to derive the predictive motion vector candidates have already been encoded and decoded, the video decoding apparatus already knows the motion vectors of the neighboring blocks as well. Accordingly, the video encoding apparatus does not need to encode information for identifying the predictive motion vector candidates. Therefore, in this case, the information about the motion vector difference and the information about the reference picture used to predict the current block are encoded.

The predictive motion vector may be determined by selecting any one of the predictive motion vector candidates. In this case, information for identifying the selected predictive motion vector candidate is further encoded along with the information about the motion vector difference and the information about the reference picture used to predict the current block.

The intra-predictor 122 predicts pixels in the current block using pixels (reference pixels) located around the current block in the current picture in which the current block is included. There is a plurality of intra-prediction modes according to the prediction directions, and the reference pixels and the equation to be used are defined differently according to each prediction mode. In particular, the intra-predictor 122 may determine an intra-prediction mode to be used in encoding the current block. In some examples, the intra-predictor 122 may encode the current block using several intra-prediction modes and select an appropriate intra-prediction mode to use from among the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the encoder 150 and transmitted to the video decoding apparatus.

The subtractor 130 subtracts the prediction block generated by the intra-predictor 122 or the inter-predictor 124 from the current block to generate a residual block.

The transformer 140 transforms residual signals in the residual block having pixel values in the spatial domain into transform coefficients in the frequency domain. The transformer 140 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 145 quantizes the transform coefficients output from the transformer 140 and outputs the quantized transform coefficients to the encoder 150.

The encoder 150 encodes the quantized transform coefficients using a coding scheme such as CABAC to generate a bitstream. The encoder 150 encodes information such as a CTU size, a MinQTSize, a MaxBTSize, a MaxBTDepth, a MinBTSize, a QT split flag, a BT split flag, and a split type, which are associated with the block split, such that the video decoding apparatus splits the block in the same manner as in the video encoding apparatus.

The encoder 150 encodes information about a prediction type indicating whether the current block is encoded by intra-prediction or inter-prediction, and encodes intra-prediction information or inter-prediction information according to the prediction type.

When the current block is intra-predicted, a syntax element for the intra-prediction mode is encoded as intra-prediction information. When the current block is inter-predicted, the encoder 150 encodes a syntax element for inter-prediction information. The syntax element for inter-prediction information includes the following information.

(1) Mode information indicating whether motion information about the current block is encoded in a merge mode or a mode for encoding a motion vector difference.

(2) Syntax element for motion information

When motion information is encoded in the merge mode, the encoder 150 may encode, as a syntax element for the motion information, merge index information indicating which merge candidate is selected as a candidate for extracting motion information about the current block from among the merge candidates.

On the other hand, when the motion information is encoded in the mode for encoding the motion vector difference, the information about the motion vector difference and the information about the reference picture are encoded as syntax elements for the motion information. When the predictive motion vector is determined in a manner of selecting one of a plurality of predictive motion vector candidates, the syntax element for the motion information further includes predictive motion vector identification information for identifying the selected candidate.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference samples in performing intra-prediction of the next block in order.

The filter unit 180 deblock-filters the boundaries between the reconstructed blocks in order to remove blocking artifacts caused by block-by-block encoding/decoding and stores the blocks in the memory 190. When all the blocks in one picture are reconstructed, the reconstructed picture is used as a reference picture for inter-predicting blocks in a subsequent picture to be encoded.

Hereinafter, a video decoding apparatus will be described.

Figure 3:
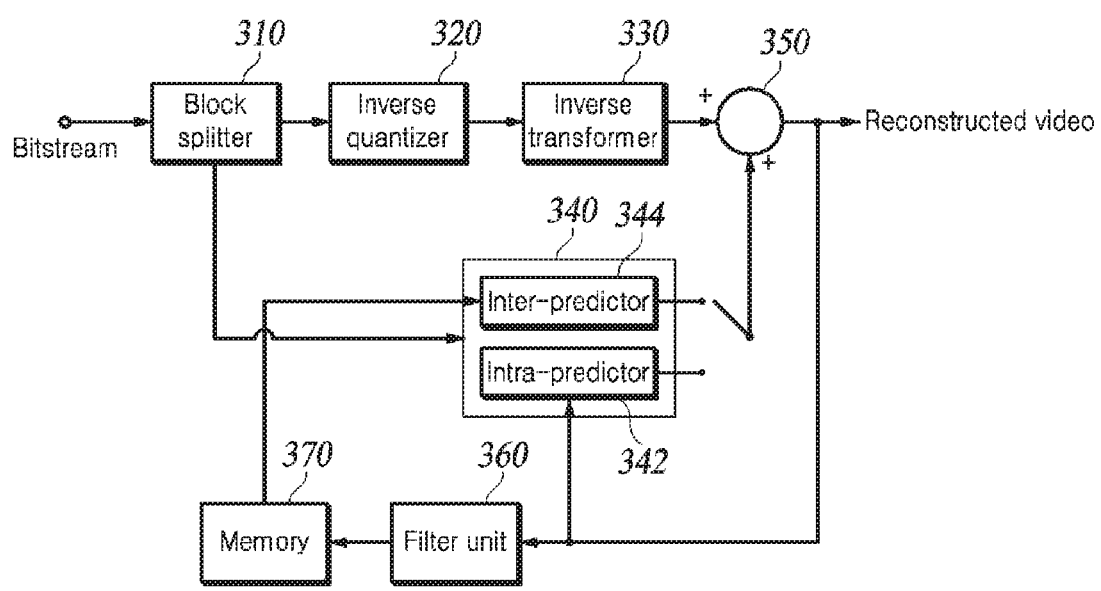
FIG. 3 is an exemplary block diagram of a video decoding apparatus according to an embodiment of the present disclosure.

FIG. 3 is an exemplary block diagram of a video decoding apparatus capable of implementing techniques of the present disclosure.

The video decoding apparatus includes a decoder 310, an inverse quantizer 320, an inverse transformer 330, a predictor 340, an adder 350, a filter unit 360, and a memory 370. As in the case of the video encoding apparatus of FIG. 2, each element of the video encoding apparatus may be implemented as a hardware chip, or may be implemented as software, and the microprocessor may be implemented to execute the functions of the software corresponding to the respective elements.

The decoder 310 decodes a bitstream received from the video encoding apparatus, extracts information related to block splitting to determine a current block to be decoded, and extracts prediction information necessary to reconstruct the current block and information about a residual signal.

The decoder 310 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts splitting information about the CTU to split the CTU using the tree structure. For example, when the CTU is split using a QTBT structure, a first flag (QT_split_flag) related to splitting of the QT is extracted to split each node into four nodes of a sub-layer. For a node corresponding to the leaf node of the QT, a second flag (BT_split_flag) and the split type information related to splitting of the BT are extracted to split the leaf node into a BT structure.

Upon determining a current block to be decoded through splitting of the tree structure, the decoder 310 extracts information about the prediction type indicating whether the current block is intra-predicted or inter-predicted.

When the prediction type information indicates intra-prediction, the decoder 310 extracts a syntax element for the intra-prediction information (intra-prediction mode) about the current block.

When the prediction type information indicates inter-prediction, the decoder 310 extracts a syntax element for the inter-prediction information. First, the decoder extracts mode information indicating an encoding mode in which the motion information about the current block is encoded among a plurality of encoding modes. Here, the plurality of encoding modes includes a merge mode and a motion vector difference encoding mode. When the mode information indicates the merge mode, the decoder 310 extracts, as the syntax element for the motion information, merge index information indicating a merge candidate from which the motion vector of the current block is to be derived among the merge candidates. On the other hand, when the mode information indicates the motion vector difference encoding mode, the decoder 310 extracts, as the syntax element for the motion vector, the information about the motion vector difference and the information about the reference picture to which the motion vector of the current block refers. When the video encoding apparatus uses one of the plurality of predictive motion vector candidates as a predictive motion vector of the current block, the predictive motion vector identification information is included in the bitstream. Therefore, in this case, not only the information about the motion vector difference and the reference picture but also the predictive motion vector identification information is extracted as the syntax element for the motion vector.

The decoder 310 extracts information about the quantized transform coefficients of the current block as information about the residual signal.

The inverse quantizer 320 inversely quantizes the quantized transform coefficients. The inverse transformer 330 inversely transforms the inversely quantized transform coefficients from the frequency domain to the spatial domain to reconstruct the residual signals, and thereby generates a residual block for the current block.

The predictor 340 includes an intra-predictor 342 and an inter-predictor 344. The intra-predictor 342 is activated when the prediction type of the current block is intra-prediction, and the inter-predictor 344 is activated when the prediction type of the current block is inter-prediction.

The intra-predictor 342 determines an intra-prediction mode of the current block among the plurality of intra-prediction modes using the syntax element for the intra-prediction mode extracted from the decoder 310, and predicts the current block using reference pixels around the current block according to the intra-prediction mode.

The inter-predictor 344 determines motion information about the current block using the syntax element for the inter-prediction information extracted from the decoder 310, and predicts the current block using the determined motion information.

First, the inter-predictor 344 checks the mode information for inter-prediction extracted from the decoder 310. When the mode information indicates the merge mode, the inter-predictor 344 configures a merge list including a predetermined number of merge candidates using neighboring blocks of the current block. The inter-predictor 344 configures the merge list in the same way as in the case of the inter-predictor 124 of the video encoding apparatus. Then, one merge candidate is selected from among the merge candidates in the merge list using the merge index information transmitted from the decoder 310. The motion information about the selected merge candidate, that is, the motion vector and the reference picture of the merge candidate, is set as a motion vector and a reference picture of the current block.

On the other hand, when the mode information indicates the motion vector difference encoding mode, the inter-predictor 344 derives predictive motion vector candidates using the motion vectors of the neighboring blocks of the current block, and determines a predictive motion vector for the motion vector of the current block using the predictive motion vector candidates. The inter-predictor 344 derives the predictive motion vector candidates in the same manner as in the case of the inter-predictor 124 of the video encoding apparatus. In the case where the video encoding apparatus uses one of the plurality of predictive motion vector candidates as the predictive motion vector of the current block, the syntax element for the motion information includes predictive motion vector identification information. Therefore, in this case, the inter-predictor 344 may select a candidate indicated by the predictive motion vector identification information among the predictive motion vector candidates as the predictive motion vector. However, when the video encoding apparatus determines the predictive motion vector by applying a predefined function to the plurality of predictive motion vector candidates, the inter-predictor 344 may determine the predictive motion vector using the same function as used by the video encoding apparatus. Once the predictive motion vector of the current block is determined, the inter-predictor 344 adds the predictive motion vector and the motion vector difference transmitted from the decoder 310 to determine the motion vector of the current block. The reference picture referred to by the motion vector of the current block is determined using the information about the reference picture delivered from the decoder 310.

When the motion vector and the reference picture of the current block are determined in the merge mode or the motion vector difference encoding mode, the inter-predictor 344 generates a prediction block for the current block using a block at the position indicated by the motion vector in the reference picture.

In the case of bidirectional prediction, the inter-predictor 344 selects a first reference picture and a second reference picture from reference picture list 0 and reference picture list 1 using syntax elements for the inter-prediction information, respectively, and determines first and second motion vectors referring to the respective reference pictures. Then, a first reference block is generated by the first motion vector referring to the first reference picture, and a second reference block is generated by the second motion vector referring to the second reference picture. A prediction block for the current block is generated by averaging or weighted-averaging the first reference block and the second reference block.

In addition, the inter-predictor 344 may perform the bidirectional optical flow (BIO) process of the present disclosure to generate a prediction block of the current block through bidirectional prediction. In other words, after determining bidirectional motion vectors for the current block, the inter-predictor 344 may generate a prediction block for the current block by motion compensation according to the BIO process on a per pixel basis or a per subblock basis.

In motion compensation by bidirectional prediction, whether to apply the BIO process may be determined in various ways. Details of the BIO process and details of whether to apply the BIO process in the motion compensation procedure will be described with reference to FIG. 4 and subsequent drawings.

The adder 350 adds the residual block output from the inverse transformer and the prediction block output from the inter-predictor or intra-predictor to reconstruct the current block. The pixels in the reconstructed current block are utilized as reference samples for intra-prediction of a block to be decoded later.

The filter unit 360 deblock-filters the boundaries between the reconstructed blocks in order to remove blocking artifacts caused by block-by-block decoding and stores the deblock-filtered blocks in the memory 370. When all the blocks in one picture are reconstructed, the reconstructed picture is used as a reference picture for inter-prediction of blocks in a subsequent picture to be decoded.

The encoding apparatus performs motion estimation and compensation in a coding unit (CU) in an inter-prediction operation, and then transmits a resulting motion vector (MV) value to the decoding apparatus. The encoding apparatus and the decoding apparatus may further correct the MV value in a pixel unit or a subblock unit (i.e., sub-CU) smaller than the CU using the BIO. That is, the BIO may precisely compensate for motion of the coding block CU in the unit of a 1×1 block (that is, one pixel) or the n×n block. In addition, since the BIO process is performed by applying an explicit equation using pre-decoded information shared between the encoding apparatus and the decoding apparatus, signaling of additional information for the BIO process from the encoding apparatus to the decoding apparatus is not required.

Figure 4:
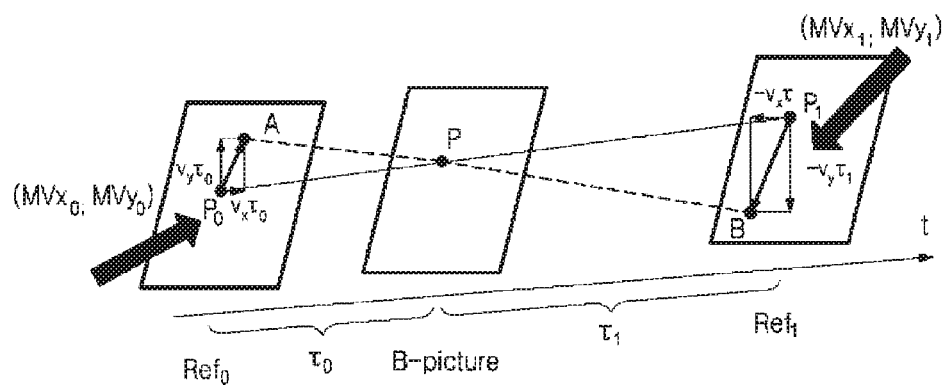
FIG. 4 is a reference diagram for explaining the basic concept of BIO.

FIG. 4 is a reference diagram for explaining the basic concept of BIO.

The BIO used for video encoding and decoding is based on the assumption that the motion vector information should be bi-prediction information, and pixels constituting an image move at a constant speed and there is little change in pixel values.

First, suppose that bidirectional motion vectors $MV_0$ and $MV_1$ have been determined by (normal) bidirectional motion prediction for the current block to be encoded in the current picture. The bidirectional motion vectors $MV_0$ and $MV_1$ point to corresponding regions (i.e., reference blocks), in the reference pictures $Ref_0$ and $Ref_1$, most similar to the current block. The two bidirectional motion vectors have values representing the motion of the current block. That is, the bidirectional motion vectors are values obtained by setting a current block as one unit and estimating the motion of the whole unit.

In the example of FIG. 4, a pixel in the reference picture $Ref_0$ indicated by the motion vector $MV_0$ and corresponding to pixel P in the current block is denoted as $P_0$, and a pixel in the reference picture $Ref_1$ indicated by the motion vector $MV_1$ and corresponding to pixel P in the current block denoted as $P_1$. Further, suppose that motion for pixel P in FIG. 4 is slightly different from the overall motion of the current block. For example, when an object located at pixel A in $Ref_0$ of FIG. 4 moves to pixel B in $Ref_1$ via pixel P in current block of the current picture, pixel A and pixel B may have values quite similar to each other. Also, in this case, the point in $Ref_0$ most similar to pixel P in the current block is not $P_0$ indicated by the motion vector $MV_0$, but pixel A which is shifted from $P_0$ by a predetermined displacement vector $(v_x\tau_0, v_y\tau_0)$. The point in $Ref_1$ most similar to pixel P in the current block is not $P_1$ indicated by the motion vector $MV_1$, but pixel B which is shifted from $P_1$ by a predetermined displacement vector $(-v_x\tau_1, -v_y\tau_1)$. $\tau_0$ and $\tau_1$ denote time-domain distances for $Ref_0$ and $Ref_1$ with respect to the current picture, respectively, and are calculated based on picture order count (POC). Hereinafter, for simplicity, $(v_x, v_y)$ is referred to as an "optical flow" or a "BIO motion vector."

Therefore, in predicting the value of pixel P of the current block in the current picture, using the values of two reference pixels A and B enables more accurate prediction than using reference pixels $P_0$ and $P_1$ indicated by the bidirectional motion vectors $MV_0$ and $MV_1$. The concept of changing the reference pixels used to predict one pixel of the current block in consideration of pixel-level motion specified by the optical flow $(v_x, v_y)$ as described above may be extended to a concept of considering subblock-level motion in units of subblocks split from the current block.

Hereinafter, a theoretical method of generating a prediction value for a pixel in a current block according to the BIO technique will be described. For simplicity, it is assumed that BIO-based bidirectional motion compensation is performed on a pixel basis.

It is assumed that bidirectional motion vectors $MV_0$ and $MV_1$ pointing to corresponding regions (i.e., reference blocks) most similar to the current block encoded in the current picture have been determined in the reference pictures $Ref_0$ and $Ref_1$ by (normal) bidirectional motion prediction for the current block. The decoding apparatus may determine the bidirectional motion vectors $MV_0$ and $MV_1$ from the motion vector information included in the bitstream. In addition, the luminance value of a pixel in the reference picture $Ref_0$ indicated by the motion vectors $MV_0$ and corresponding to the pixel (i, j) in the current block is defined as $I^{(0)}(i, j)$, and the luminance value of a pixel in the reference picture $Ref_1$ indicated by the motion vectors $MV_1$ and corresponding to the pixel (i, j) in the current block is defined as $I^{(1)}(i, j)$.

The luminance value of pixel A in the reference picture $Ref_0$ indicating that the BIO motion vector $(v_x, v_y)$ corresponds to a pixel in the current block may be defined as $I^{(0)}(i+v_x\tau_0, j+v_y\tau_0)$, and the luminance value of pixel B in the reference picture $Ref_1$ may be defined as $I^{(1)}(i-v_x\tau_1, j-v_y\tau_1)$. Here, when linear approximation is performed using only the first-order term of the Taylor series, A and B may be expressed as Equation 1.

$$\begin{aligned} A &= I^{(0)}(i + v_x\tau_0, j + v_y\tau_0) \\ &\approx I^{(0)}(i, j) + v_x\tau_0 I_x^{(0)}(i, j) + v_y\tau_0 I_y^{(0)}(i, j) \\ B &= I^{(1)}(i - v_x\tau_1, j - v_y\tau_1) \\ &\approx I^{(1)}(i, j) - v_x\tau_1 I_x^{(1)}(i, j) - v_y\tau_1 I_y^{(1)}(i, j) \end{aligned} \quad \text{[Equation 1]}$$

Here, $I_x^{(k)}$ and $I_y^{(k)}$ (k=0, 1) are gradient values in the horizontal and vertical directions at position (i, j) of $Ref_0$ and $Ref_1$. $\tau 0$ and $\tau_1$ denote time-domain distances for $Ref_0$ and $Ref_1$ with respect to the current picture, respectively, and are calculated based on POC: $\tau_0$=POC(current)−POC($Ref_0$), $\tau_1$=POC($Ref_1$)−POC(current).

The bidirectional optical flow ($v_x$, $v_y$) of each pixel in a block is determined as a solution that minimizes $\Delta$, which is defined as a difference between pixel A and pixel B. $\Delta$ may be defined by Equation 2 using the linear approximation of A and B derived from Equation 1.

$$\Delta = A - B \quad \text{[Equation 2]}$$
$$= (I^{(0)} - I^{(1)}) + v_x(\tau_0 I_x^{(0)} + \tau_1 I_x^{(1)}) +$$
$$v_y(\tau_0 I_y^{(0)} + \tau_1 I_y^{(1)})$$

For simplicity, the position (i, j) of a pixel is omitted from each term of Equation 2 above.

To implement more robust optical flow estimation, it is assumed that the motion is locally consistent with neighboring pixels. For the BIO motion vector for a pixel (i, j) that is currently to be predicted, the differences $\Delta$ in Equation 2 for all pixels (i', j') present in a mask $\Omega$ whose size is (2M+1)×(2M+1) centered on the pixel (i, j) that is currently to be predicted are considered. That is, the optical flow for the current pixel (i, j) may be determined as a vector that minimizes the objective function $\phi(v_x, v_y)$, which is the sum of squares of the differences $\Delta[i', j']$ obtained for the respective pixels in the mask $\Omega$, as shown in Equation 3.

$$\Phi(v_x, v_y) = \sum_{[i',j']\in\Omega} \Delta^2[i', j'] \quad \text{[Equation 3]}$$

Figure 5:
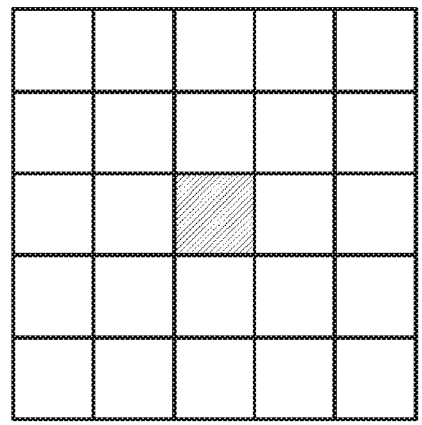
FIG. 5 is an exemplary diagram of the shape of a mask centered on a current pixel in pixel-based BIO.

Here, (i', j') denotes the positions of the pixels in the mask $\Omega$. For example, when M=2, the mask has a shape as shown in FIG. 5. The pixel in the hatched area located at the center of the mask is the current pixel (i, j), and the pixels in the mask $\Omega$ are represented by (i', j').

In order to estimate the optical flow ($v_x$, $v_y$) of each pixel (i, j) in the block, a solution which minimizes the objective function $\phi(v_x, v_y)$ is calculated by an analytical method. $\partial\phi(v_x, v_y)/\partial v_x=0$ and $\partial\phi(v_x, v_y)/\partial v_y=0$ may be derived by partial derivatives of the objective function $\phi(v_x, v_y)$ with respect to $v_x$ and $v_y$, and Equation 4 may be obtained by solving the two equations as simultaneous equations.

$$s_1 v_x(i,j) + s_2 v_y(i,j) = -s_3$$
$$s_4 v_x(i,j) + s_5 v_y(i,j) = -s_6 \quad \text{[Equation 4]}$$

In Equation 4, $s_1$, $s_2$, $s_3$, $s_4$, $s_5$, and $s_6$ are given as shown in Equation 5.

[Equation 5]
$$s_1 = \sum_{[i',j']\in\Omega} \{(\tau_0 I_x^{(0)}(i', j') + \tau_1 I_x^{(1)}(i', j'))^2\}$$
$$s_2 = \sum_{[i',j']\in\Omega} \{(\tau_0 I_x^{(0)}(i', j') + \tau_1 I_x^{(1)}(i', j'))(\tau_0 I_y^{(0)}(i', j') + \tau_1 I_y^{(1)}(i', j'))\}$$
$$s_3 = -\sum_{[i',j']\in\Omega} \{(\tau_0 I_x^{(0)}(i', j') + \tau_1 I_x^{(1)}(i', j'))(I^{(0)}(i', j') - I^{(1)}(i', j'))\}$$
$$s_4 = \sum_{[i',j']\in\Omega} \{(\tau_0 I_x^{(0)}(i', j') + \tau_1 I_x^{(1)}(i', j'))(\tau_0 I_y^{(0)}(i', j') + \tau_1 I_y^{(1)}(i', j'))\}$$
$$s_5 = \sum_{[i',j']\in\Omega} \{(\tau_0 I_y^{(0)}(i', j') + \tau_1 I_y^{(1)}(i', j'))^2\}$$

-continued
$$s_6 = -\sum_{[i',j']\in\Omega} \{(\tau_0 I_y^{(0)}(i', j') + \tau_1 I_y^{(1)}(i', j'))(I^{(0)}(i', j') - I^{(1)}(i', j'))\}$$

Here, since $s_2=s_4$, $s_4$ is replaced by $s_2$.

By solving Equation 4, which is the system of equations, $v_x$ and $v_y$ may be estimated. For example, using Cramer's rule, $v_x$ and $v_y$ may be derived as Equation 6.

$$v_x(i, j) = -\frac{s_3 s_5 - s_2 s_6}{s_1 s_5 - s_2^2} \quad \text{[Equation 6]}$$
$$v_y(i, j) = -\frac{s_1 s_6 - s_3 s_2}{s_1 s_5 - s_2^2}$$

As another example, a simplified method of calculating an approximation of $v_x$ by substituting $v_y=0$ into the first equation of Equation 4, and an approximation of $v_y$ by substituting the calculated value of $v_x$ into the second equation may be used. In this case, $v_x$ and $v_y$ are expressed as shown in Equation 7.

$$v_x(i, j) = -\frac{s_3}{s_1 + r}, s_1 + r > m \quad \text{[Equation 7]}$$
$$v_y(i, j) = -\frac{s_6 - s_2 v_x}{s_5 + r}, s_5 + r > m,$$

where r and m are normalization parameters introduced to avoid performing division by 0 or a very small value. In Equation 7, when $s_1+r>m$ is not satisfied, $v_x(i, j)=0$ is set. When $s_5+r>m$ is not satisfied, $v_y(i, j)=0$ is set.

As another example, an approximation of $v_x$ may be calculated by substituting $v_y=0$ into the first equation of Equation 4, and an approximation of $v_y$ may be calculated by substituting $v_x=0$ into the second equation. With this method, $v_x$ and $v_y$ may be calculated independently, and may be expressed as Equation 8.

$$v_x(i, j) = -\frac{s_3}{s_1 + r}, s_1 + r > m \quad \text{[Equation 8]}$$
$$v_y(i, j) = -\frac{s_6}{s_5 + r}, s_5 + r > m$$

As another example, an approximation of $v_x$ may be calculated by substituting $v_y=0$ into the first equation of Equation 4, and $v_y$ may be calculated as the average of a first approximation of $v_y$ obtained by substituting the approximation of $v_x$ into the second equation and a second approximation of $v_y$ obtained by substituting $v_x=0$ into the second equation. Using this method, $v_x$ and $v_y$ are obtained as shown in Equation 9.

$$v_x(i, j) = -\frac{s_3}{s_1 + r}, s_1 + r > m \quad \text{[Equation 9]}$$
$$v_y(i, j) = -\frac{s_6 - s_2 v_x/2}{s_5 + r}, s_5 + r > m$$

The normalization parameters r and m used in Equations 7 to 9 may be defined as in Equation 10.

$$r = 500 \cdot 4^{d-8}$$
$$m = 700 \cdot 4^{d-8} \quad \text{[Equation 10]}$$

Here, d denotes the bit depth of the pixels of an image.

The optical flows $v_x$ and $v_y$ of the respective pixels in a block are obtained by calculation using Equations 6 to 9 for each pixel in the block.

Once the optical flow ($v_x$, $v_y$) of the current pixel is determined, a bidirectional prediction value $pred_{BIO}$ for the current pixel (i, j) according to the BIO may be calculated by Equation 11.

$$pred_{BIO} = 1/2 \cdot (I^{(0)} + I^{(1)} + v_x(\tau_0 \partial I_x^{(0)} - \tau_1 \partial I_x^{(1)}) + v_y(\tau_0 \partial I_y^{(0)} - \tau_1 \partial I_y^{(1)})), \text{ or}$$

$$pred_{BIO} = 1/2 \cdot (I^{(0)} + I^{(1)} + v_x/2(\tau_1 \partial I_x^{(1)} - \tau_0 \partial I_x^{(0)}) + v_y/2(\tau_1 \partial I_y^{(1)} - \tau_0 \partial I_y^{(0)}))$$ [Equation 11]

In Equation 11, $(I^{(0)} + I^{(1)})/2$ is typical bidirectional motion compensation on a block basis, and therefore the remaining terms may be referred to as BIO offsets.

Figure 6:
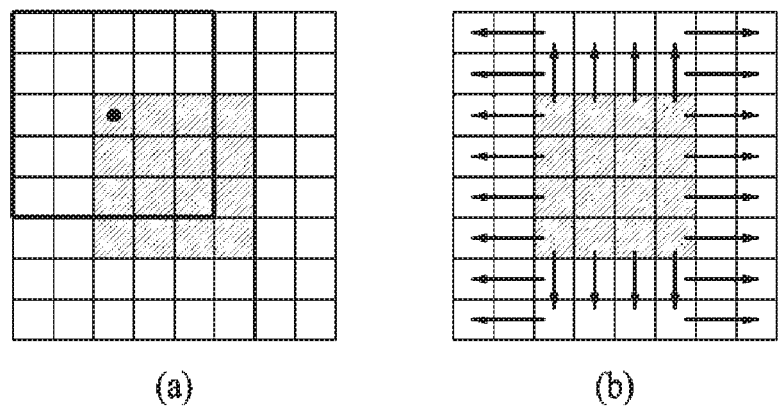
FIG. 6 is an exemplary diagram for explaining setting a luminance value and a gradient for pixels at positions outside a reference block within a mask in a padding manner.

In typical bidirectional motion compensation, a prediction block of the current block is generated using the pixels in the reference block. On the other hand, to use a mask, access to pixels other than the pixels in the reference block should be allowed. For example, the mask for the pixel at the top leftmost position (position (0, 0)) of a reference block as shown in FIG. 6(a) includes pixels located at positions outside the reference block. In order to maintain the same memory access as in typical bidirectional motion compensation and to reduce the computational complexity of the BIO, $I^{(k)}$, $I_x^{(k)}$, and $I_y^{(k)}$ of pixels outside the reference block which are positioned within the mask may be padded with the corresponding values of the closest pixel in the reference block. For example, as shown in FIG. 6(b), when the size of the mask is 5×5, $I^{(k)}$, $I_x^{(k)}$, and $I_y^{(k)}$ of external pixels located above the reference block may be padded with $I^{(k)}$, $I_x^{(k)}$, and $I_y^{(k)}$ of the pixels in the top row of the reference block. $I^{(k)}$, $I_x^{(k)}$, and $I_y^{(k)}$ of external pixels on the left side of the reference block may be padded with $I^{(k)}$, $I_x^{(k)}$, and $I_y^{(k)}$ of the pixels in the leftmost column of the reference block.

The BIO process on the basis of pixels in the current block has been described. However, to reduce computational complexity, the BIO process may be performed on a block basis, for example, on a 4×4 block basis. With the BIO carried out on a per subblock basis in the current block, optical flows $v_x$ and $v_y$ may be obtained on a per subblock basis in the current block using Equations 6 to 9. The subblock-based BIO is based on the same principle as the pixel-based BIO, except for the range of the mask.

Figure 7:
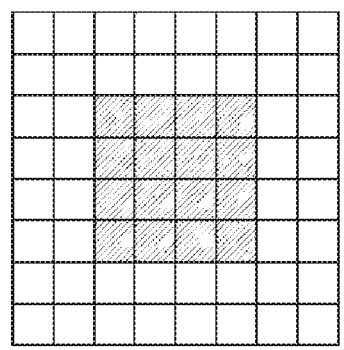
FIG. 7 is an exemplary diagram of the shape of a mask centered on a subblock in subblock-based BIO.

As an example, the range of the mask Ω may be extended to include the range of a subblock. When the size of the subblock is N×N, the size of the mask Ω is (2M+N)×(2M+N). For example, when M=2 and the size of the subblock is 4×4, the mask has a shape as shown in FIG. 7. As of Equation 2 may be calculated for all pixels in the mask Ω including the subblock to obtain the objective function of Equation 3 for the subblock, and the optical flows ($v_x$, $v_y$) may be calculated on the subblock basis by applying Equations 4 to 9.

As another example, Δs of Equation 2 may be calculated by applying a mask to all pixels in the subblock on a pixel-by-pixel basis, and the objective function of Equation 3 for the subblock may be obtained by obtaining the sum of squares of Δs. Then, the optical flow ($v_x$, $v_y$) for the subblock may be calculated in such a manner as to minimize the objective function. For example, referring to FIG. 8, Δs of Equation 2 may be calculated for all pixels in a 5×5 mask 810a by applying the mask 810a to the pixel at position (0, 0) of a 4×4 subblock 820 in the current block. Then, Δs of Equation 2 may be calculated for all pixels in a 5×5 mask 810b by applying the mask 810b to the pixel at position (0, 1). Through this process, the objective function of Equation 3 may be obtained by summing the squares of the calculated Δs for all the pixels in the subblock. Then, an optical flow ($v_x$, $v_y$) that minimizes the objective function may be calculated. In this example, the objective function is expressed as Equation 12.

$$\Phi(v_x, v_y) = \sum_{(x,y) \in b_k} \sum_{[i',j'] \in \Omega(x,y)} \Delta^2(i', j'),$$ [Equation 12]

where $b_k$ denotes a k-th subblock in the current block, and Ω(x, y) denotes a mask for a pixel having coordinates (x, y) in the k-th subblock. $s_1$ to $s_6$, which are used for calculation of an optical flow ($v_x$, $v_y$), is modified as in Equation 13.

[Equation 13]

$$s_{1,b_k} = \sum_{(x,y) \in b_k} \sum_{[i',j] \in \Omega(x,y)} (\tau_1 \partial I^{(1)}/\partial x + \tau_0 \partial I^{(0)}/\partial x)^2;$$

$$s_{3,b_k} = \sum_{(x,y) \in b_k} \sum_{[i',j] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial y)$$

In the equation above, $\partial I^{(k)}/\partial x$ and $\partial I^{(k)}/\partial y$ denote $I_x^{(k)}$ and $I_y^{(k)}$, that is, a horizontal gradient and a vertical gradient, respectively.

Figures 8, 9:
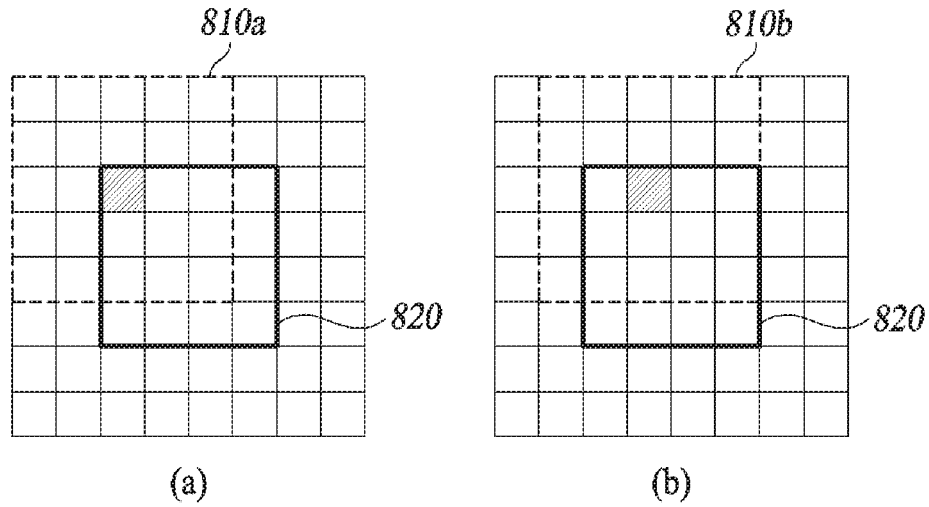
FIG. 8 is an exemplary diagram for explaining applying a mask on a pixel-by-pixel basis in the subblock-based BIO.
FIG. 9 is an exemplary diagram of the shape of another mask centered on a subblock in the subblock-based BIO.

As another example, a subblock-based mask as shown in FIG. 7 may be used and a weight may be applied at each position of the mask. A higher weight is applied at a position closer to the center of the subblock. For example, referring to FIG. 8, when the mask is applied on a pixel-by-pixel basis in the subblock, Δs for the same position may be redundantly calculated. Most of the pixels located within the mask 810a centered on the pixel at position (0, 0) of the subblock 820 are also located within the mask 810b centered on the pixel at position (1, 0) of the subblock 820. Therefore, Δs may be redundantly calculated. Instead of repeatedly calculating the overlap Δ, a weight may be assigned to each position in the mask according to the number of overlaps. For example, when M=2 and the size of the subblock is 4×4, a weighted mask as shown in FIG. 9 may be used. In this way, the operation of Equations 12 and 13 may be simplified, thereby reducing computational complexity.

The pixel-based or subblock-based BIO described above requires a large amount of computation. Therefore, a method for reducing the amount of computation according to BIO is required in video encoding or decoding. For this purpose, the present disclosure proposes that the BIO process be skipped in motion compensation when certain conditions are met.

Figure 10:
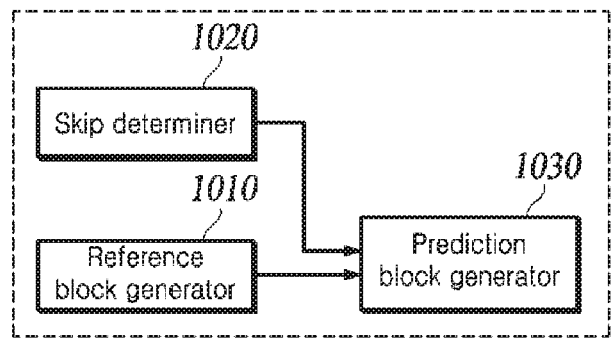
FIG. 10 is a block diagram illustrating a configuration of a device configured to perform motion compensation by selectively applying a BIO process according to an embodiment of the present disclosure.

FIG. 10 is a block diagram illustrating a configuration of a device configured to perform motion compensation by selectively applying a BIO process according to an embodiment of the present disclosure.

A motion compensation device 1000 described in this embodiment, which may be implemented in the inter predictor 124 of the video encoding apparatus and/or the inter predictor 344 of the video decoding apparatus, may include a reference block generator 1010, a skip determiner 1020, and a prediction block generator 1030. Each of these components may be implemented as a hardware chip or may be implemented as software, and one or more microprocessors may be implemented to execute the functions of the software corresponding to the respective components.

The reference block generator 1010 generates a first reference block using a first motion vector referring to a first reference picture in reference picture list 0, and generates a second reference picture using a second motion vector referring to a second reference picture in reference picture list 1.

The skip determiner 1020 determines whether to apply the BIO process in the motion compensation procedure.

When it is determined by the skip determiner 1020 that the BIO process is skipped, the prediction block generator 1030 generates a prediction block of a current block by typical motion compensation. That is, the prediction block of the current block is generated by averaging or weighted-averaging the first reference block and the second reference block. On the other hand, when it is determined by the skip determiner 1020 that the BIO process is applied, the prediction block generator 1030 generates a prediction block of the current block using the first reference block and the second reference block according to the BIO process. That is, the prediction block of the current block may be generated by applying Equation 11.

The skip determiner 1020 may determine whether to apply the BIO process based on one or more of the following conditions:

Texture complexity of the current block;
Size of the current block and/or mode information indicating a motion information encoding mode;
Whether bidirectional motion vectors (first motion vector and second motion vector) satisfy a constant velocity constraint (CVC) and/or a brightness constancy constraint (BCC); and
Degree of variation of motion vectors of neighboring blocks.

Hereinafter, a detailed method of determining whether to apply the BIO process using each condition will be described.

Embodiment 1: BIO Skip According to Texture Complexity

Optical flow tends to yield a result that is not robust in smooth areas where there are few local features, such as edges or corners. In addition, it is likely that an area having such a smooth texture has already been sufficiently predicted through conventional block-based motion estimation. Therefore, in the present embodiment, texture complexity of the current block is calculated and the BIO process is skipped depending on the texture complexity.

To allow the encoding apparatus and the decoding apparatus to calculate the texture complexity without additional signaling, the texture complexity of the current block may be calculated using the first reference block and the second reference block shared between the encoding apparatus and the decoding apparatus. That is, the skip determiner implemented in each of the encoding apparatus and the decoding apparatus determines whether to skip the BIO process by calculating the texture complexity of the current block.

For the texture complexity, a local feature detector with a small amount of computation such as a difference from neighboring pixels, a gradient, and a Moravec may be used. In this embodiment, the texture complexity is calculated using the gradient. The gradients for the reference blocks are values used in the BIO process. Accordingly, this embodiment has the advantage that the gradient values calculated in the texture complexity can be directly applied in carrying out the BIO process.

The motion compensation device 1000 according to this embodiment calculates texture complexity using a horizontal gradient and a vertical gradient of each pixel in the first reference block and the second reference block. As one example, the motion compensation device 1000 calculates horizontal complexity using the horizontal gradients of the respective pixels in the first reference block and the second reference block, and calculates vertical complexity using the vertical gradients of the respective pixels in the first reference block and the second reference block. For example, the horizontal complexity and the vertical complexity may be calculated by Equation 14.

$$D_1 = \sum_{[i,j] \in CU} (d_1(i,j)) \quad \text{[Equation 14]}$$

$$D_5 = \sum_{[i,j] \in CU} (d_5(i,j)),$$

where $D_1$ and $D_5$ denote horizontal complexity and vertical complexity, respectively, and CU denotes a set of pixel positions in the first reference block and the second reference block corresponding to the positions of the respective pixels in the current block. [i, j] denotes a position in the first reference block and the second reference block corresponding to each pixel in the current block. And $d_1(i, j)$ and $d_5(i, j)$ may be calculated by Equation 15.

$$d_1 = (I_x^{(0)}(i,j) + I_x^{(1)}(i,j))^2$$

$$d_2 = (I_x^{(0)}(i,j) + I_x^{(1)}(i,j))(I_y^{(0)}(i,j) + I_y^{(1)}(i,j))$$

$$d_3 = (I_x^{(0)}(i,j) + I_x^{(1)}(i,j))(I^{(0)}(i,j) - I^{(1)}(i,j))$$

$$d_5 = (I_y^{(0)}(i,j) + I_y^{(1)}(i,j))^2$$

$$d_6 = (I_y^{(0)}(i,j) + I_y^{(1)}(i,j))(I^{(0)}(i,j) - I^{(1)}(i,j)) \quad \text{[Equation 15]}$$

Using $d_1$ and $d_5$ of Equation 15, the horizontal and vertical complexities may be calculated in Equation 14. That is, the horizontal complexity $D_1$ may be calculated by calculating the sum of horizontal gradients ($\tau_0 I_x^{(0)}(i,j)$, $\tau_1 I_x^{(1)}(i,j)$) for every pixel position in consideration of the time-domain distances ($\tau_0, \tau_1$) for the pixels at positions corresponding to each other in the first reference block and the second reference block and summing the squares of the sums. Then, the vertical complexity $D_5$ may be calculated by calculating the sum of vertical gradients ($\tau_0 I_x^{(0)}(i,j)$, $\tau_1 I_x^{(1)}(i,j)$) for every pixel position in consideration of the time-domain distances for the pixels at positions corresponding to each other in the first reference block and the second reference block and summing the squares of the sums.

In Equation 15, $d_4$ is omitted. $d_4$ has the same value as $d_2$. It can be seen that $d_1$ to $d_6$ of Equation 15 are associated with $s_1$ to $s_6$ of Equation 5. $d_1$ to $d_6$ represent values at one pixel position, and $s_1$ to $s_6$ represent the sum of each of $d_1$ to $d_6$ calculated at all pixel positions in a mask centered on one pixel. That is, using Equation 15, Equation 5 may be expressed as Equation 16 below. In Equation 16, $s_4$ is omitted because $s_4$ has the same value as $s_2$.

$$s_1 = \sum_{[i',j']\in\Omega} (d_1(i', j'))$$

$$s_2 = \sum_{[i',j']\in\Omega} (d_2(i', j'))$$

$$s_3 = \sum_{[i',j']\in\Omega} (d_3(i', j'))$$

$$s_5 = \sum_{[i',j']\in\Omega} (d_5(i', j'))$$

$$s_6 = \sum_{[i',j']\in\Omega} (d_6(i', j'))$$

[Equation 16]

The texture complexity for the current block may be set to any of the minimum $\text{Min}(D_1, D_5)$, the maximum $\text{Max}(D_1, D_5)$, or the average $\text{Ave}(D_1, D_5)$ of the horizontal complexity and the vertical complexity. The motion compensation device 1000 skips the BIO process when the texture complexity is less than a threshold T, and applies the BIO process when the texture complexity is greater than or equal to the threshold T. When the BIO process is applied, $d_1$ to $d_6$ calculated in Equation 14 may be used for calculation of $s_1$ to $s_6$. That is, according to this embodiment, the texture complexity of the current block is obtained using values to be calculated during the BIO process and whether to skip the BIO process is determined based thereon. Accordingly, additional computation for determining whether to skip the BIO process may be reduced.

For the threshold T, a method of scaling the normalization parameter used in Equations 7 to 9 may be used. The normalization parameters r and m have relations of $s_1 > m-r$ and $s_5 > m-r$. When $s_1 <= m-r$, $v_x$ is 0 even if BIO is performed. When $s_5 <= m-r$, $v_y$ is 0 even if BIO is performed.

Therefore, when the threshold value T is set based on the relations of the normalization parameters, the BIO may be skipped by pre-determining, on a CU basis, a region that is set to 0 even if the BIO is performed. $D_1$ is the sum of $d_1$ for all pixel positions in the CU and $s_1$ is the sum of $d_1$ in the mask $\Omega$. Therefore, when the size of the CU is W×H and the size of the mask $\Omega$ is (2M+1)×(2M+1), the threshold T may be set as in Equation 17.

$$T = (m - r) \times \frac{W \times H}{(2M + 1)^2}$$ [Equation 17]

Figure 11:
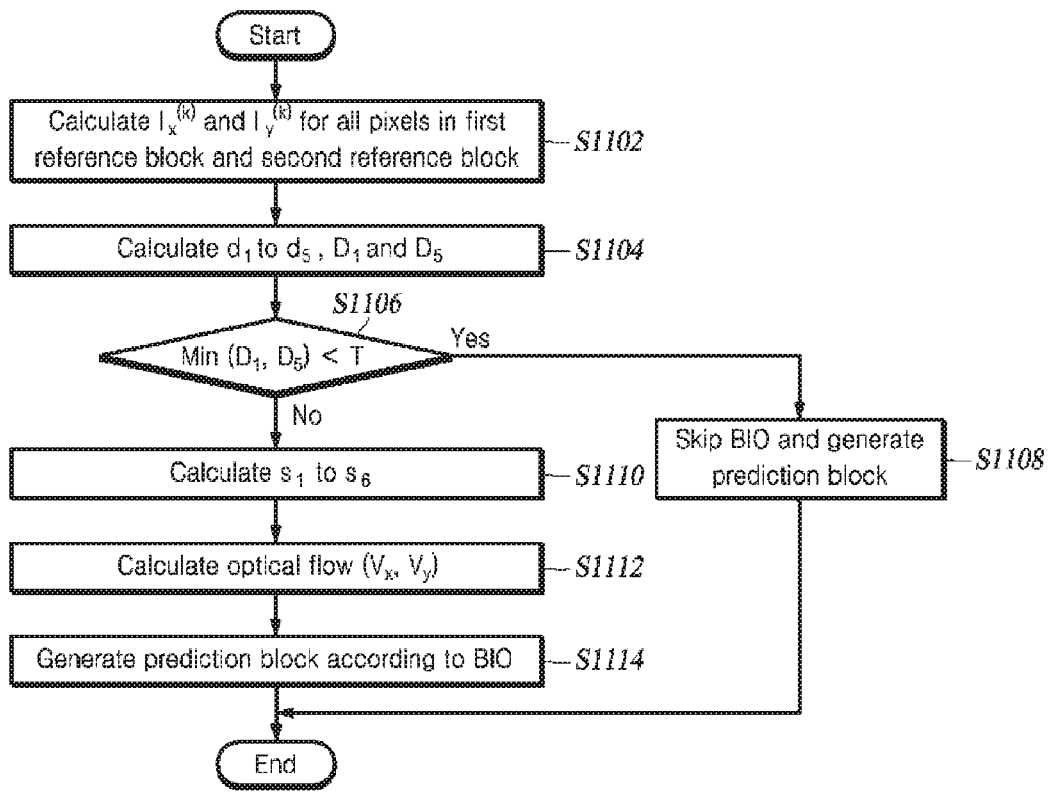
FIG. 11 is an exemplary diagram illustrating a procedure of performing motion compensation by selectively applying the BIO process based on texture complexity of a current block according to an embodiment of the present disclosure.

FIG. 11 is an exemplary diagram illustrating a procedure of performing motion compensation by selectively applying the BIO process based on texture complexity of a current block according to an embodiment of the present disclosure.

The motion compensation device 1000 calculates a horizontal gradient $I_x^{(k)}$ and a vertical gradient $I_y^{(k)}$ for each pixel in the first reference block and the second reference block (S1102). Then, $d_1$ to $d_6$ are calculated using Equation 15, and horizontal complexity $D_1$ and vertical complexity $D_5$ are calculated according to Equation 14 using $d_1$ and $d_5$ (S1104). It is determined whether the texture complexity of the current block, which is the minimum between the horizontal complexity $D_1$ and the vertical complexity $D_5$, is less than the threshold T (S1106). While the texture complexity of the current block is described in this example as being the minimum between the horizontal complexity $D_1$ and the vertical complexity $D_5$, the texture complexity may be set to the maximum or average value.

When the texture complexity of the current block is less than the threshold T, the BIO process is skipped and a prediction block of the current block is generated by typical motion compensation (S1108). That is, the prediction block of the current block is generated by averaging or weighted-averaging the first reference block and the second reference block.

When the texture complexity of the current block is greater than or equal to the threshold T, the prediction block for the current block is generated using the first reference block and the second reference block according to the BIO process. First, $s_1$ to $s_6$ are calculated. Since the horizontal and vertical gradients for the pixels in the reference blocks have already been calculated in S1102, the horizontal and vertical gradients need to be calculated only for the pixels outside the reference block which are present in the mask to obtain $s_1$ to $s_6$. Alternatively, when the horizontal gradient and the vertical gradient for the pixels outside the reference block are padded with corresponding values of pixels of the reference block close thereto as described above, $s_1$ to $s_6$ may be obtained using only the already-calculated horizontal and vertical gradients for the pixels in the reference blocks.

Alternatively, since $d_1$ to $d_6$ are associated with $s_1$ to $s_6$ (see Equation 16), the calculated values of $d_1$ to $d_6$ may be used in calculating $s_1$ to $s_6$.

Once $s_1$ to $s_6$ are calculated, a pixel-based or subblock-based optical flow $(v_x, v_y)$ is determined using one of Equations 6 to 9 (S1112). Then, by applying the optical flow $(v_x, v_y)$ to the corresponding pixel or subblock in the current block, a prediction block of the current block is generated according to Equation 11 (S1114).

Figure 12:
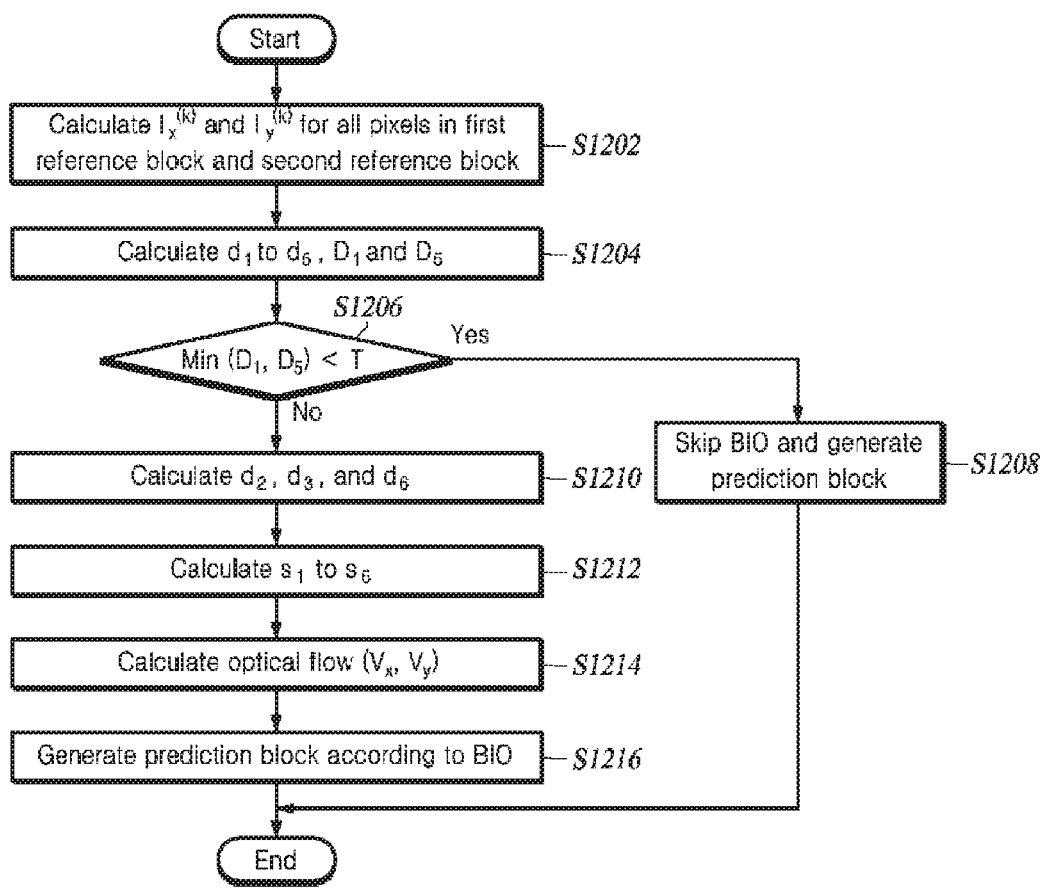
FIG. 12 is another exemplary diagram illustrating a procedure of performing motion compensation by selectively applying the BIO process based on texture complexity of a current block according to an embodiment of the present disclosure.

FIG. 12 is another exemplary diagram illustrating a procedure of performing motion compensation by selectively applying the BIO process based on texture complexity of a current block according to an embodiment of the present disclosure.

The example disclosed in FIG. 12 differs from the example of FIG. 11 only in the order in which $d_1$ to $d_6$ are calculated. That is, only $d_1$ and $d_5$ among $d_1$ to $d_6$ are needed to calculate the texture complexity of the current block. Therefore, as in S1204, $d_1$ and $d_5$ are obtained first. And $d_2$, $d_3$, $d_4$ (equal to d2), and $d_6$ are calculated when the texture complexity is greater than the threshold and thus the BIO process is performed (S1210). Other operations are substantially the same as those in FIG. 11.

The table below shows an experimental result comparing motion compensation according to the BIO process with motion compensation performed by selectively applying the BIO process based on the texture complexity according to the present embodiment.

TABLE 1

| | Random Access Main 10 | | | |
| --- | --- | --- | --- | --- |
| | Over JEM-6 | | | |
| | Y | U | V | skip ratio |
| Class A1 | 0.03% | −0.12% | −0.03% | 32% |
| Class B | 0.02% | −0.03% | −0.01% | 21% |
| Class C | 0.02% | −0.01% | −0.04% | 12% |
| Class D | 0.02% | 0.03% | 0.01% | 9% |
| Overall (Ref) | 0.02% | −0.03% | −0.01% | 19% |

The sequences used in the experiment were 4 for Class A1 (4K), 5 for Class B (FHD), 4 for Class C (832×480), and 4 for Class D (416×240), and the experiment was conducted using all frames of the respective videos. The experimental environment was random access (RA) configuration, and the BD rates were compared by conducting the experiment by setting the QP to 22, 27, 32, and 37.

According to the present embodiment, BIO was skipped by about 19% on average, and 32% of BIO was skipped in Class A1 (4K), which has the largest amount of computation. The experiment showed that, as the resolution of the image increases, the ratio of skipping increases. The result of the experiment may be considered as significant because increase in resolution substantially increases the burden in terms of the amount of computation.

In addition, although there was an increase of Y BD rate of 0.02% on average, a BD rate difference of 0.1% or less is generally considered negligible. Accordingly, it may be seen that compression efficiency is almost the same even if the BIO is selectively skipped according to this example.

The examples described above are related to determining whether to skip the entire BIO process. Instead of skipping the entire BIO process, the horizontal optical flow $v_x$ and the vertical optical flow $v_y$ may be independently skipped. That is, the BIO process in the horizontal direction is skipped by setting $v_x=0$ when the horizontal complexity $D_1$ is less than the threshold T, and the BIO process in the vertical direction is skipped by setting $v_y=0$ when the vertical complexity $D_5$ is less than the threshold T.

Figure 13:
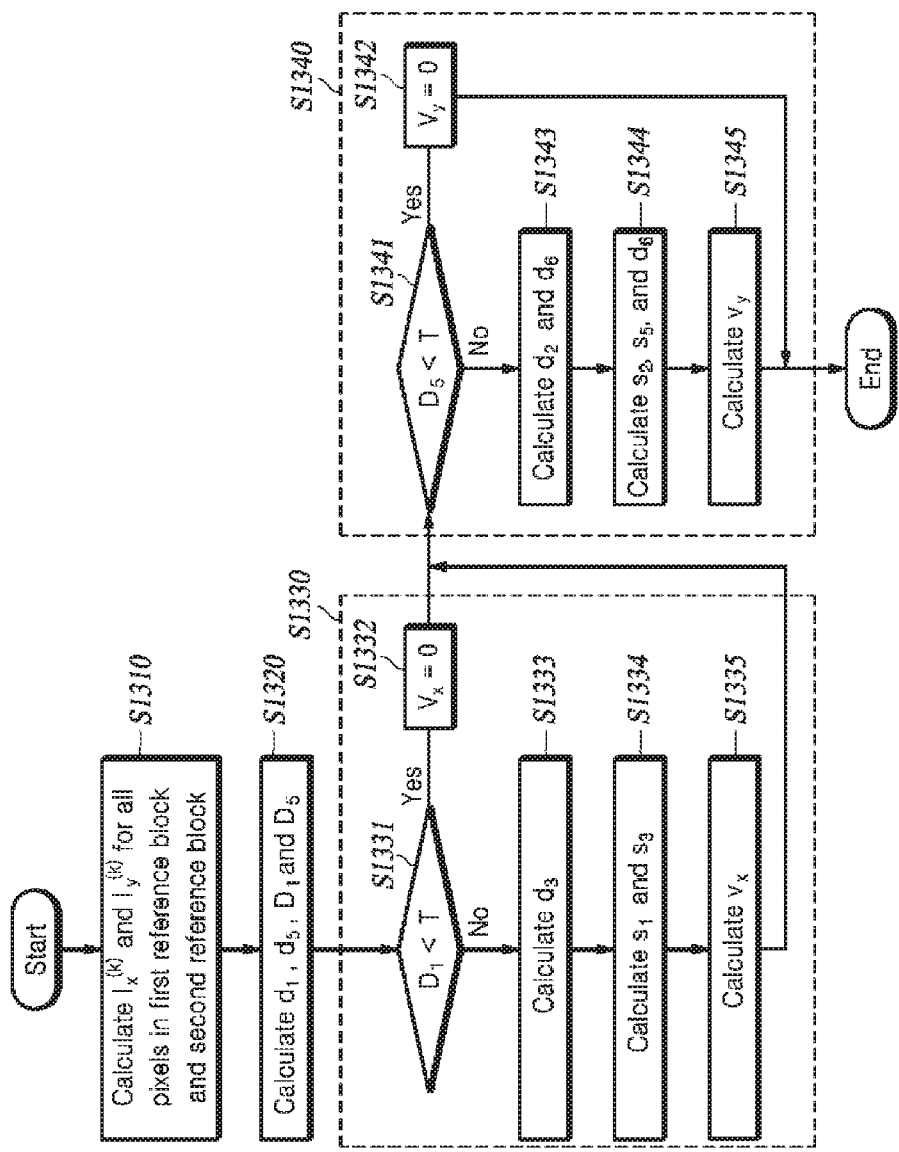
FIG. 13 is yet another exemplary diagram illustrating a procedure of performing motion compensation by selectively applying the BIO process based on texture complexity of a current block according to an embodiment of the present disclosure.

FIG. 13 is yet another exemplary diagram illustrating a procedure of performing motion compensation by selectively applying the BIO process based on texture complexity of a current block according to an embodiment of the present disclosure.

The motion compensation device 1000 calculates a horizontal gradient $I_x^{(k)}$ and a vertical gradient $I_y^{(k)}$ for each pixel in the first reference block and the second reference block (S1310). Then, $d_1$ and $d_5$ are calculated using Equation 15, horizontal complexity $D_1$ is calculated using $d_1$, and vertical complexity $D_5$ is calculated using $d_5$ (S1320).

Once the horizontal complexity $D_1$ and the vertical complexity $D_5$ are calculated in S1320, an operation of determining whether to skip the horizontal optical flow (S1330) and an operation of determining whether to skip the vertical optical flow (S1340) are performed. While FIG. 13 illustrates that whether to skip the horizontal optical flow is determined first, whether to skip the vertical optical flow may be determined first.

In S1330, the motion compensation device 1000 determines whether the horizontal complexity D1 is less than the threshold T (S1331). When the horizontal complexity $D_1$ is less than the threshold T, the horizontal optical flow $v_x$ is set to 0 (S1332). This means that the horizontal optical flow is not applied. When the horizontal complexity $D_1$ is greater than or equal to the threshold T, $d_3$ is calculated (S1333), and $s_1$ and $s_3$ are calculated using $d_1$ and $d_3$ (S1334). Referring to Equations 7 to 9, when the horizontal optical flow $v_x$ is calculated, only $s_1$ and $s_3$ are required. Since $d_1$ has already been calculated in S1320, $d_3$ is calculated in S1333 and $s_1$ and $s_3$ are calculated in S1334 using $d_1$ and $d_3$. Then, the horizontal optical flow $v_x$ is calculated using $s_1$ and $s_3$ according to any one of Equations 7 to 9 (S1335).

Then, the process proceeds to S1340 to determine whether to skip the vertical direction optical flow. It is determined whether the vertical complexity $D_5$ is less than the threshold T (S1341). When the vertical complexity $D_5$ is less than the threshold T, the vertical optical flow $v_y$ is set to 0 (S1342). This means that the vertical optical flow is not applied. When the vertical complexity $D_5$ is greater than or equal to the threshold T, $d_2$ and $d_6$ are calculated (S1343), and $s_2$, $s_5$, and $s_6$ are calculated using $d_2$, $d_5$, and $d_6$ (S1344). When the vertical optical flow $v_y$ is calculated using Equation 7 or 9, only $s_2$, $s_5$, and $s_6$ are required. Since $d_5$ has already been calculated in S1320, $d_2$ and $d_6$ are calculated in S1343, and $s_2$, $s_5$, and $s_6$ are calculated in S1344 using $d_2$, $d_5$, and $d_6$. Then, the vertical optical flow $v_y$ is calculated using $s_2$, $s_5$, and $s_6$ according to Equation 7 or 9 (S1345).

When the vertical optical flow $v_y$ is calculated using Equation 8, only $s_5$ and $s_6$ are required. In this case, therefore, calculation of $d_2$ and $s_2$ may be omitted in S1343 and S1344.

Substituting the horizontal optical flow $v_x$ and the vertical optical flow $v_y$ calculated in this way into Equation 11 produces a prediction block of the current block. When the horizontal optical flow is skipped, $v_x=0$ in Equation 11, and therefore the horizontal optical flow $v_x$ does not contribute to generating the prediction block. Similarly, when the vertical optical flow is skipped, $v_y=0$, and therefore the vertical optical flow $v_y$ does not contribute to generating the prediction block. When both the horizontal and vertical optical flows are skipped, $v_x=0$ and $v_y=0$, and therefore a prediction block is generated by averaging the first reference block and the second reference block. That is, the prediction block is generated through typical motion compensation.

In Embodiment 1 described above, the texture complexity of the current block is estimated using the pixels in the reference block. However, the texture complexity of the current block may be calculated using the actual pixels in the current block. For example, the encoding apparatus may calculate the horizontal complexity and the vertical complexity using the horizontal and vertical gradients of the pixels in the current block. That is, the horizontal complexity is calculated using the sum of squares of the horizontal gradients of the respective pixels in the current block, and the vertical complexity is calculated using the sum of squares of the vertical gradients. The horizontal and vertical complexities are then used to determine whether to skip the BIO process. In this case, unlike the encoding apparatus, the decoding apparatus does not know the pixels in the current block. Accordingly, the decoding apparatus cannot calculate the texture complexity in the same manner as the encoding apparatus. Therefore, the encoding apparatus should additionally signal information indicating whether BIO is skipped to the decoding apparatus. That is, the skip determiner implemented in the decoding apparatus decodes the information indicating whether to skip the BIO received from the encoding apparatus and selectively skips the BIO process as indicated by the information.

Embodiment 2: BIO Skip According to Size of Current Block and/or Motion Information Encoding Mode As described above, the CU corresponding to a leaf node of a tree structure, that is, the current block, may have various sizes according to the tree structure splitting from the CTU.

When the size of the current block is sufficiently small, the motion vector of the current block is likely to have a value substantially similar to the pixel-based or subblock-based BIO, and thus the compensation effect obtained by performing BIO may be small. In this case, decrease in complexity obtained by skipping the BIO is likely to be a greater benefit than precision loss due to skipping the BIO.

As described above, the motion vector of the current block may be encoded in a merge mode or in a mode for encoding a motion vector difference. When the motion vector of the current block is encoded in the merge mode, the motion vector of the current block is merged with the motion vector of a neighboring block. That is, the motion vector of the current block is set to equal to the motion vector of the neighboring block. In this case, an additional compensation effect may be obtained through the BIO.

Accordingly, in the present embodiment, the BIO process is skipped based on at least one of the size of the current block or the mode information indicating the encoding mode of the motion vector.

Figure 14:
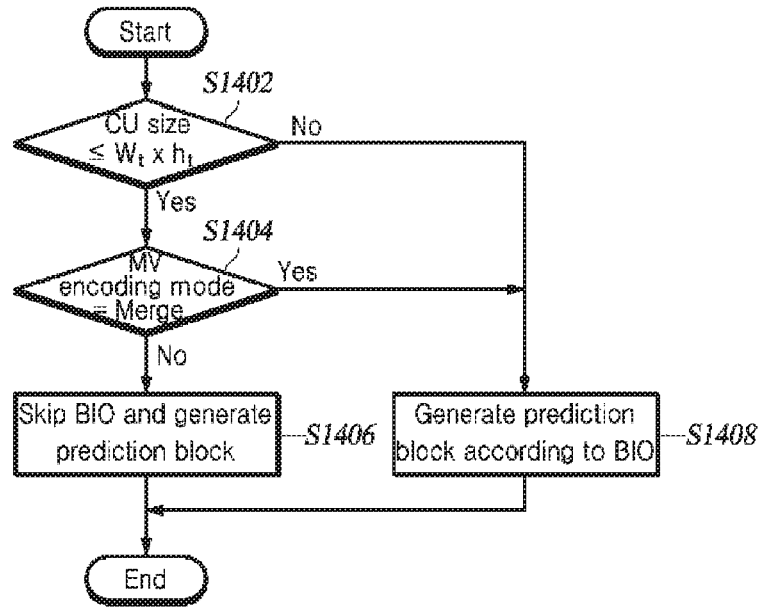
FIG. 14 is an exemplary diagram illustrating a procedure of performing motion compensation by selectively applying the BIO process based on the size of a current block and an encoding mode of a motion vector according to an embodiment of the present disclosure.

FIG. 14 is an exemplary diagram illustrating a procedure of performing motion compensation by selectively applying the BIO process based on the size of the current block and an encoding mode of the motion vector according to an embodiment of the present disclosure. Although FIG. 14 illustrates that both the size of the current block and the encoding mode of the motion vector are used to determine whether to skip BIO is determined, using any one thereof is also within the scope of the present disclosure.

The motion compensation device 1000 first determines whether the size of the current block CU, which is a block to be encoded, is less than or equal to a threshold size (S1402). When the size of the current block CU is greater than the threshold size, a prediction block of the current block is generated according to the BIO process (S1408).

On the other hand, when the size of the current block CU is less than or equal to the threshold size, it is determined whether the motion vector MV of the current block CU is encoded by the merge mode (S1404). When the motion vector is not encoded by the merge mode, the BIO process is skipped and a prediction block of the current block is generated through typical motion compensation (S1406). When the motion vector is encoded by the merge mode, a prediction block of the current block is generated according to the BIO process (S1408).

For example, when $w_t \times h_t$ is defined as 8×8, and the motion vector of the current block having a size of 8×8, 8×4, 4×8, or 4×4, which is less than or equal to 8×8, is not encoded by the merge mode, the BIO process is skipped.

In generating the prediction block according to the BIO process in S1308, whether to skip the BIO may be further determined according to Embodiment 1, that is, the texture complexity of the current block.

Embodiment 3: BIO Skip According to CVC and/or BCC

The BIO is based on the assumption that an object in the video moves at a constant velocity and that there is little change in pixel value. These assumptions are defined as a constant velocity constraint (CVC) and a brightness constancy constraint (BCC), respectively.

When the bidirectional motion vectors $(MVx_0, MVy_0)$ and $(MVx_1, MVy_1)$ estimated on a current block basis satisfy the two conditions of CVC and BCC, the BIO operating based on the same assumptions is also likely to have values similar to the bidirectional motion vectors of the current block.

Satisfying the CVC condition by the bidirectional motion vectors $(MVx_0, MVy_0)$ and $(MVx_1, MVy_1)$ of the current block means that the two motion vectors have opposite signs and have the same motion displacement per time.

Satisfying the BCC condition by the bidirectional motion vectors of the current block means that the difference between a first reference block located in a first reference picture $Ref_0$ indicated by $(MVx_0, MVy_0)$ and a reference block located in a second reference picture $Ref_1$ indicated by $(MVx_1, MVy_1)$ is 0. The difference between the two reference blocks may be calculated by sum of absolute differences (SAD), sum of squared errors (SSE), or the like.

As an example, the CVC condition and the BCC condition may be expressed as follows.

$$|MVx_0/\tau_0 + MVx_1/\tau_1| < T_{CVC} \ \& \ |MVy_0/\tau_0 + MVy_1/\tau_1| < T_{CVC}$$

$$\Sigma(i,j)|I^{(0)}(i+MVx_0, j+MVy_0) - I^{(1)}(i+MVx_1, j+MVy_1)| < T_{BCC},$$ [Equation 18]

where $T_{CVC}$ and $T_{BCC}$ are thresholds of the CVC condition and the BCC condition, respectively.

Referring to FIG. 4, the BIO assumes that an optical flow $(+v_x, +v_y)$ for the first reference picture $Ref_0$ and an optical flow $(-v_x, -v_y)$ for the second reference picture $Ref_1$ have the same magnitude but different signs. Therefore, in order for the bidirectional motion vectors $(MVx_0, MVy_0)$ and $(MVx_1, MVy_1)$ to satisfy the BIO assumption, the x components $MVx_0$ and $MVx_1$ of the bidirectional motion vectors should have different signs, and the y components $MVy_0$ and $MVy_1$ should also have different signs. In addition, in order to satisfy the CVC condition, the absolute value of $MVx_0$ divided by $\tau_0$, which is the time-domain distance between the current picture and the first reference picture, should be equal to the absolute value of $MVx_1$ divided by $\tau_1$, which is the time-domain distance between the current picture and the second reference picture. Similarly, the absolute value of $MVy_0$ divided by $\tau_0$ and the absolute value of $MVy_1$ divided by $\tau_1$ should be equal to each other. Therefore, based on the concept of a threshold, the CVC condition as given above may be derived.

The BCC condition is satisfied when the SAD between the reference blocks that the bidirectional motion vectors $(MVx_0, MVy_0)$ and $(MVx_1, MVy_1)$ refer to, respectively, is less than or equal to a threshold $T_{BCC}$. Of course, other indicators that may represent the difference between two reference blocks, such as SSE, may be used instead of SAD.

Figure 15:
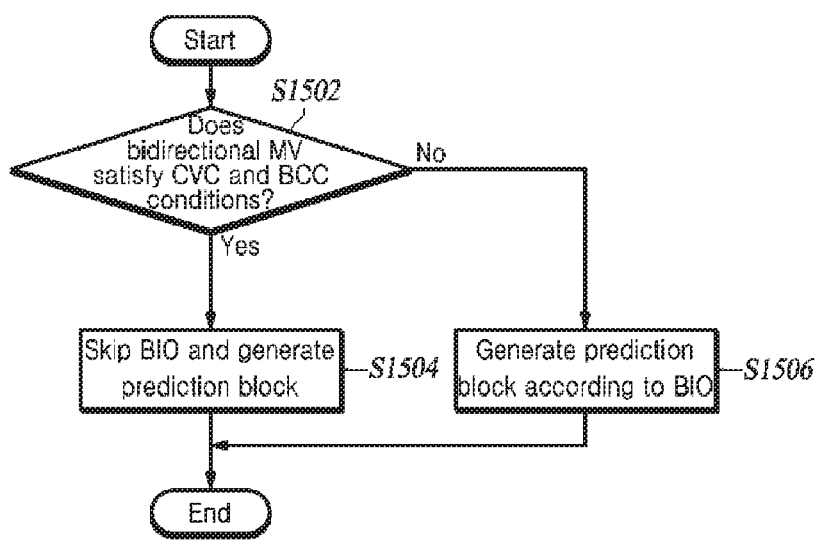
FIG. 15 is an exemplary diagram illustrating a procedure of performing motion compensation by selectively applying the BIO process based on a CVC condition and a BCC condition according to an embodiment of the present disclosure.

FIG. 15 is an exemplary diagram illustrating a procedure of performing motion compensation by selectively applying the BIO process based on the CVC condition and the BCC condition according to an embodiment of the present disclosure.

The motion compensation device 1000 determines whether the bidirectional motion vectors $(MVx_0, MVy_0)$ and $(MVx_1, MVy_1)$ of the current block satisfy the CVC condition and the BCC condition (S1502). When both conditions are met, the BIO process is skipped and a prediction block is generated according to typical motion compensation (S1504).

On the other hand, when any one of the two conditions is not satisfied, a prediction block of the current block is generated according to the BIO process (S1506).

While FIG. 15 illustrates that the BIO process is skipped when both the CVC condition and the BCC condition are satisfied, this is merely an example. Whether to skip BIO may be determined based on one of the CVC condition and the BCC condition.

Embodiment 4: BIO Skip According to the Degree of Variation of Motion Vectors of Neighboring Blocks When the bidirectional motion vectors estimated on a per block basis in the neighboring blocks of the current block have similar values, the optical flows estimated on a per pixel basis or per subblock basis in the current block are also likely to have similar values.

Therefore, whether to skip the BIO of the current block may be determined based on the degree of variation of the motion vectors of the neighboring blocks, for example, variance or standard deviation. As an extreme example, when the variance of motion vectors of the neighboring blocks is 0, the optical flows on a per pixel basis or per subblock basis in the current block are also likely to have the same value as the motion vector of the current block, and thus the BIO is skipped.

As an example, the motion vector variance of the neighboring blocks may be expressed as Equation 19.

$$VAR_{MV} = VAR_x + VAR_y \quad \text{[Equation 19]}$$

$$VAR_x = \sum_{(m,n) \in L} \left| MVx_{t(m,n)} - \frac{1}{I} \sum_{(m,n) \in L} MVx_{t(m,n)} \right|$$

$$VAR_y = \sum_{(m,n) \in L} \left| MVy_{t(m,n)} - \frac{1}{I} \sum_{(m,n) \in L} MVy_{t(m,n)} \right|,$$

where L is a set of neighboring blocks and I is the total number of neighboring blocks. (m, n) denotes the indexes of the neighboring blocks and t∈(0, 1).

Figure 16:
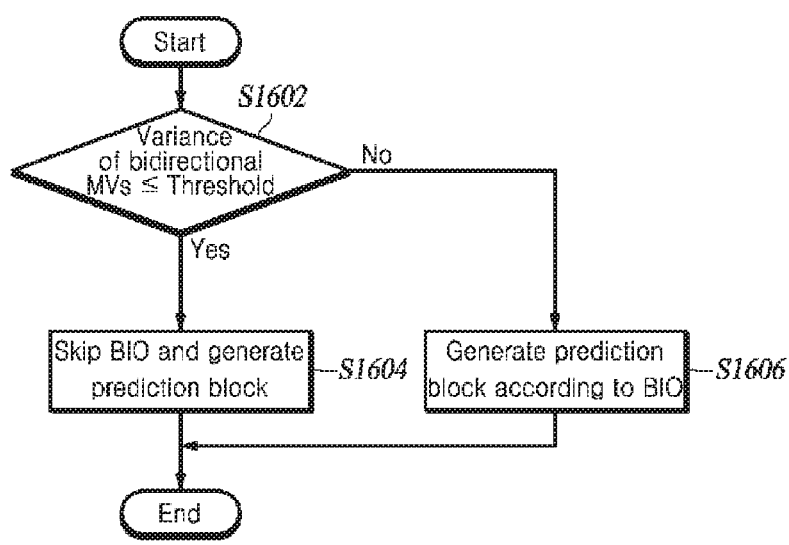
FIG. 16 is an exemplary diagram illustrating a procedure of performing motion compensation by selectively applying the BIO process based on a motion vector variance of neighboring blocks according to an embodiment of the present disclosure.

FIG. 16 is an exemplary diagram illustrating a procedure of performing motion compensation by selectively applying the BIO process based on a motion vector variance of neighboring blocks according to an embodiment of the present disclosure.

The motion compensation device 1000 compares the variance of the motion vectors of the neighboring blocks with a predetermined threshold (S1602). When the motion vector variance of the neighboring blocks is less than the threshold, the BIO process is skipped and a prediction block is generated according to the typical motion compensation (S1604). On the other hand, when the motion vector variance of the neighboring blocks is greater than the threshold, a prediction block of the current block is generated according to the BIO process (S1606).

In Embodiments 1 to 4, determining whether to skip the BIO using each condition individually has been described. However, the present disclosure is not limited to determining whether to skip the BIO using any one condition. Determining whether to skip the BIO by selectively combining the multiple conditions described in the present disclosure should also be construed as being within the scope of the present disclosure. For example, selectively combining various methods described in the present disclosure, such as determining whether to skip the BIO based on the size and texture complexity of the current block, determining whether to skip the BIO based on the size of the current block, the CVC condition and/or the BCC condition, and determining whether to skip of the BIO based on one or more of the CVC condition and the BCC condition and the texture complexity of the current block, should be construed as being within the scope of the present disclosure.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereto.

CROSS-REFERENCE TO RELATED APPLICATION

This application claims priority to Patent Application No. 10-2017-0109632, filed on Aug. 29, 2017 in Korea, and Patent Application No. 10-2017-0175587, filed on Dec. 19, 2017 in Korea, the entire contents of which are incorporated herein by reference.

What is claimed is:

1. An inter prediction apparatus for predicting a current block using a bi-directional optical flow in a video encoding or decoding, the apparatus comprising one or more processor configured to:
    generate a first motion vector for a first reference picture and a second motion vector for a second reference picture;
    derive a variable from sample value differences between samples in the first reference picture which are determined based on the first motion vector and samples in the second reference picture which are determined based on the second motion vector, wherein the variable is SAD (Sum of Absolute Differences) or SSE (Sum of Squared Errors) and is used for determining whether to apply the bi-directional optical flow; and
    generate a prediction block of the current block from the first and second reference pictures, by selectively either applying or skipping the bi-directional optical flow depending on the variable.

2. The apparatus of claim 1, wherein the bi-directional optical flow is skipped when the variable is less than a predetermined threshold, and is applied when the variable is greater than the predetermined threshold.

3. The apparatus of claim 1, wherein, when at least one of a width or a height of the current block is less than a predetermined length, the bi-directional optical flow is skipped.

4. The apparatus of claim 3, wherein the predetermined length is 8.

5. An inter prediction method for predicting a current block using a bi-directional optical flow in a video encoding or decoding, the method comprising:
    generating a first motion vector for a first reference picture and a second motion vector for a second reference picture;
    deriving a variable from sample value differences between samples in the first reference picture which are determined based on the first motion vector and samples in the second reference picture which are determined based on the second motion vector, wherein the variable is SAD (Sum of Absolute Differences) or SSE (Sum of Squared Errors) and is used for determining whether to apply the bi-directional optical flow; and
    generating a prediction block of the current block from the first and second reference pictures, by selectively either applying or skipping the bi-directional optical flow depending on the variable.

6. The method of claim 5, wherein the bi-directional optical flow is skipped when the variable is less than a predetermined threshold, and is applied when the variable is greater than the predetermined threshold.

7. The method of claim 5, wherein, when at least one of a width or a height of the current block is less than a predetermined length, the bi-directional optical flow is skipped.

8. The method of claim 7, wherein the predetermined length is 8.

* * * * *